Oct. 15, 1929.  C. ECKART, JR  1,731,847
BRONZE AND TINCTURE CONTAINER
Filed Jan. 4, 1929
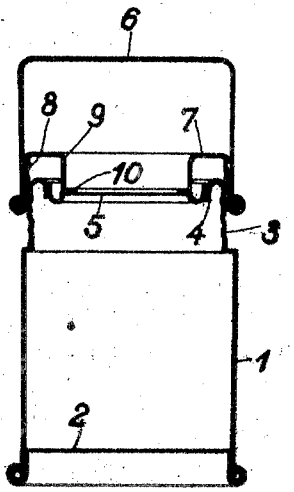
Inventor:
C. Eckart, Jr.
By: Marks & Clerk
Attys.

Patented Oct. 15, 1929

1,731,847

UNITED STATES PATENT OFFICE

CARL ECKART, JR., OF FURTH, GERMANY

BRONZE AND TINCTURE CONTAINER

Application filed January 4, 1929, Serial No. 330,274, and in Germany January 9, 1928.

This invention relates to a bronze and tincture container with an intermediate partition, separating the bronze and tincture from one another, which can be displaced by pushing or is removable. The invention differs from the known devices of this type in this, that the bronze container is combined with the tincture container by means of a screw thread, and the removal of the intermediate partition provided in the tincture container is effected by screwing the bronze container and tincture container towards one another.

In the accompanying drawing one constructional form of the invention is shown diagrammatically in sectional elevation by way of example.

The tincture container has the form of an ordinary paint box comprising a casing 1, beaded bottom 2 and screw-threaded part 3, the rim 4 of which is bent over into the box and accommodates the cover 5 such that it can be pressed out. The cover 5 at the same time forms the separating partition between the tincture container 1 and the bronze container 6.

The bronze-container 6 is provided at the rim with a beaded annular member 7 of U-shaped cross section. The outer wall 8 of the member 7 lies close to the wall of the bronze container 6 and has a beaded screw thread, so that the bronze container 6 by means of this thread may be screwed on to the screw threaded part 3 of the tincture container 1. The interior wall 9 of the member 7 lies with an inwardly bent circular flange 10 against the cover 5 of the tincture container 1. The cover 5 may therefore be pressed into the tincture container 1 by screwing this container and the bronze container 6 towards one another.

The filling of the bronze and tincture containers is carried out in such a way that first the tincture container 1 is filled with tincture and the bronze container 6 is filled, the right way up, with bronze. Then the tincture container 1, previously closed by the cover 5 is screwed in the inverted position on the bronze container 6 until its circular flange 10 lies against the cover 5. The bronze and tincture container is then ready for transport.

In order to use the container the bronze container 6 and the tincture container 1 are screwed towards one another. The circular flange 10 of the bronze container 6 presses the cover 5 of the tincture container 1 into the latter. In this way the communication between the bronze container 6 and the tincture container 1 is produced. The bronze falls into the tincture and is intimately mixed with this by shaking the container. If, then, the bronze container 6 is unscrewed from the tincture container 1, the bronze mixture ready for spreading may be used out of the latter. If the bronze tincture is not completely used up, the tincture-container 1 may easily be closed again by the bronze container 6.

Owing to the provision of the screw-threaded portion 3 on the tincture container 1 and of the circular flange 7 in the bronze container the latter no longer projects into the former. In this way the whole interior space of the tincture container 1 is free for the accommodation of tincture. The screw joint may also be replaced by a bayonet-joint with inclined engaging surfaces.

What I claim is:

1. A bronze and tincture container comprising a bronze container and a tincture container both provided with screw-threaded portions capable of engaging with one another, a cover for the tincture container serving as an intermediate partition between the bronze container and the tincture container and means on the bronze container capable of removing the said cover from its position when the bronze and the tincture containers are screw-threaded so as to move towards one another for the purpose of placing the bronze container in open communication with the tincture container.

2. A bronze and tincture container as claimed in claim 1, in which the screw-threaded portion of the tincture container lies within the screw-threaded portion on the bronze container and in which the means for removing the cover of the tincture container consists of an annular flange provided on the bronze container and arranged to abut against the said cover.

3. A bronze and tincture container as claimed in claim 1 in which the screw-threaded portion of the tincture container lies within the screw-threaded portion on the bronze container and in which the means for removing the cover consists of a beaded annular member of U-shaped cross-section, the inner wall of which has an inwardly bent circular flange abutting against the said cover and the screw-threaded portion of the bronze container forming the outer wall of the said annular member of U-shaped cross-section.

In testimony whereof I have signed my name to this specification.

CARL ECKART JUN.